Jan. 19, 1937.  E. E. HEWITT  2,068,325
FLUID PRESSURE BRAKE
Filed Jan. 29, 1932  2 Sheets-Sheet 1
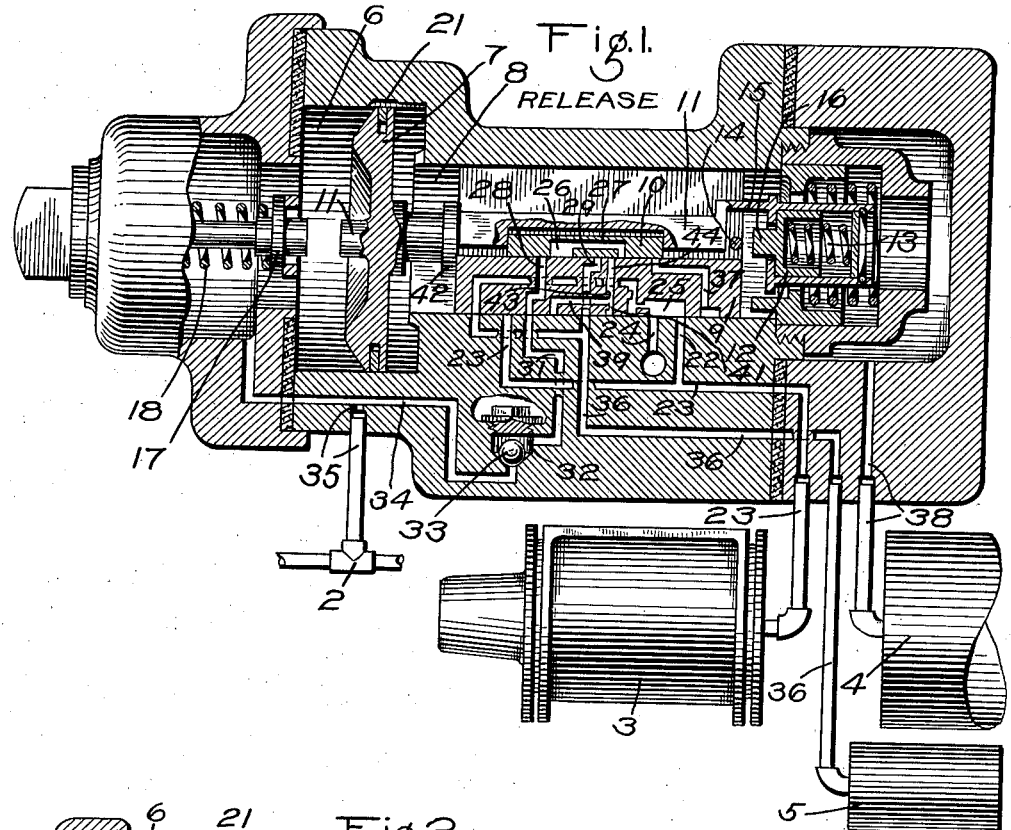
Fig.1. RELEASE
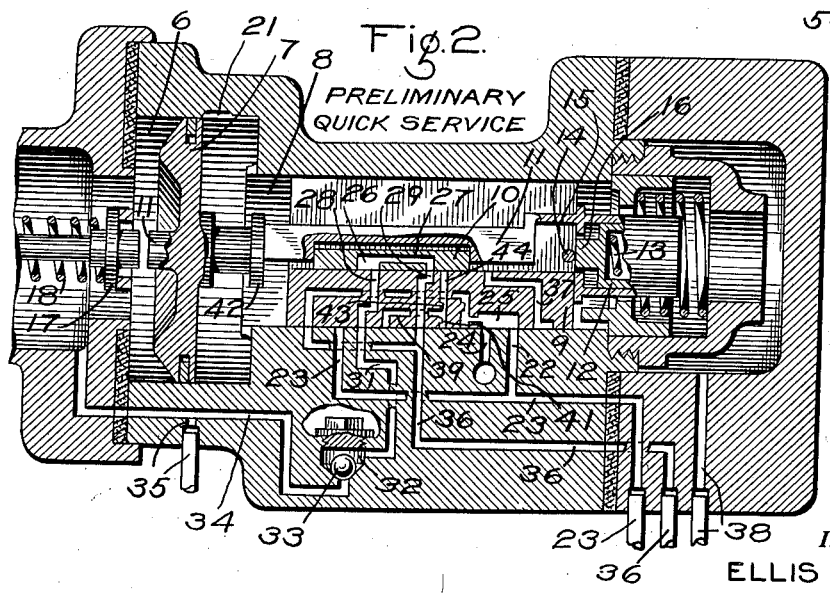
Fig.2. PRELIMINARY QUICK SERVICE
INVENTOR.
ELLIS E. HEWITT
By
*Wm. M. Cady*
ATTORNEY.

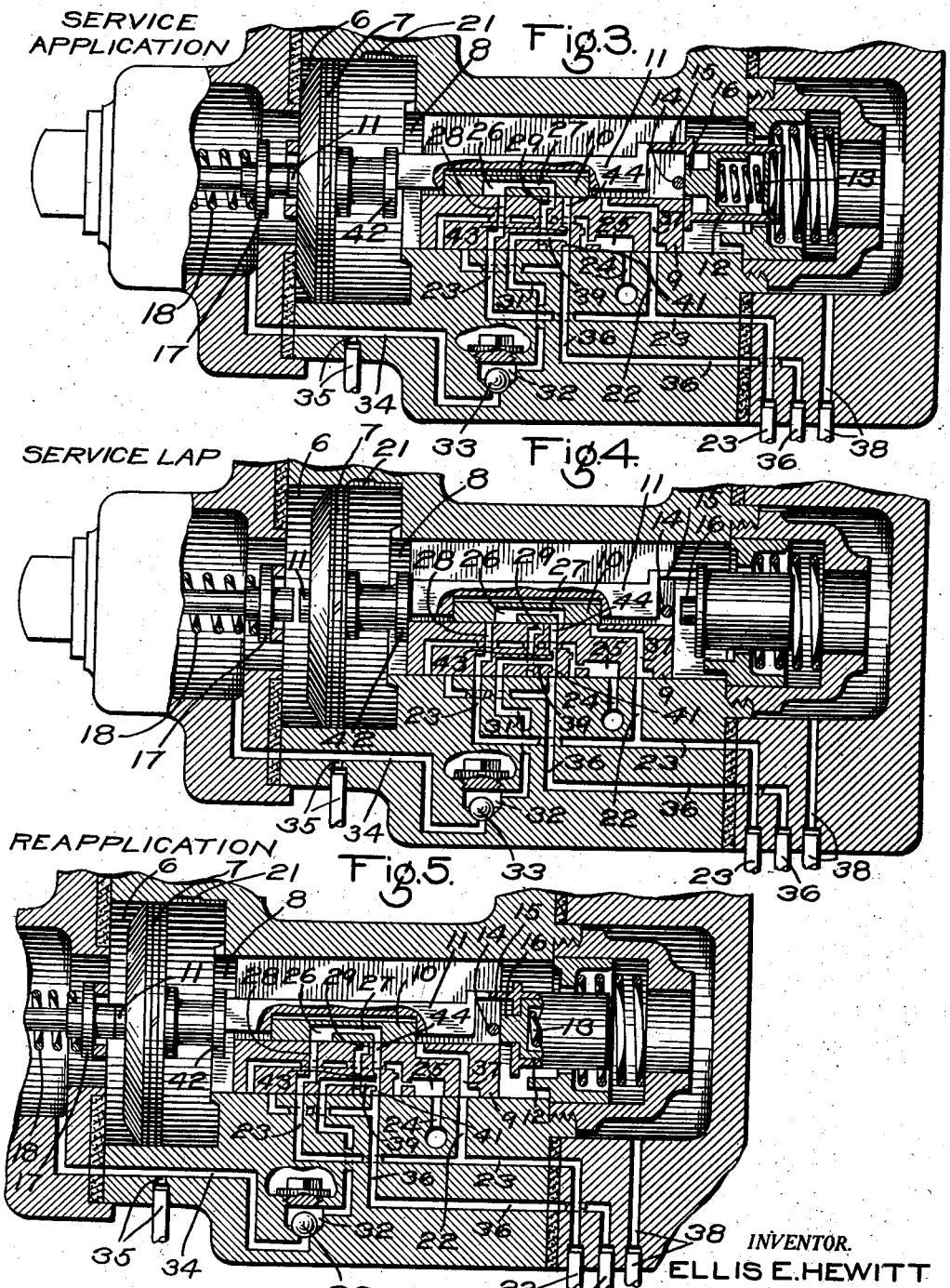
Jan. 19, 1937. E. E. HEWITT 2,068,325
FLUID PRESSURE BRAKE
Filed Jan. 29, 1932 2 Sheets-Sheet 2
INVENTOR.
ELLIS E. HEWITT
BY
ATTORNEY.

Patented Jan. 19, 1937

2,068,325

UNITED STATES PATENT OFFICE 2,068,325

FLUID PRESSURE BRAKE

Ellis E. Hewitt, Edgewood, Pa., assignor to The Westinghouse Air Brake Company, Wilmerding, Pa., a corporation of Pennsylvania Application January 29, 1932, Serial No. 589,632

18 Claims. (Cl. 303—38)

This invention relates to fluid pressure brakes, and more particularly to the well known automatic fluid pressure brake system, in which the brakes are applied by effecting a reduction in brake pipe pressure and are released by effecting an increase in brake pipe pressure.

With the increase in train length, the difficulty of applying and releasing the brakes without causing excessive shock is correspondingly increased, due to the running in of the slack before the brakes are applied on the rear cars of the train, and the running out of the slack before the brakes are released on the rear cars.

In actual service, difficulty is encountered in causing all brakes to apply on long trains, because of the slow rate of brake pipe reduction, due to the length of the brake pipe, and to the auxiliary reservoir of the brake equipment discharging fluid into the brake pipe through the feed groove, and due to the fact that the brakes apply slowly because of the slow rate of reduction in brake pipe pressure, which is due to necessity of discharging an increased amount of brake pipe fluid at the brake valve, so that excessively heavy reductions in brake pipe pressures must be made to insure that all brakes will apply, especially when the brake pipe leakage is of a minimum amount. Consequently, shocks are produced, not only because of the slow serial application of the brakes, but also because the brakes apply non-uniformly in degree of brake force.

It has been proposed to effect a local venting of fluid from the brake pipe to cause quick serial action (commonly known as quick service) by the initial movement of the triple valve piston and graduating valve before the main slide valve of the triple valve is moved, this initial movement of the triple valve piston and graduating valve being effected upon a light but predetermined and definite reduction in brake pipe pressure.

In the patents of Clyde C. Farmer, numbered 2,032,169, 2,034,287 and 2,031,213, and assigned to the assignee of this application, are disclosed fluid brake equipments wherein the above mentioned quick service features are embodied and wherein the triple valve piston first moves the graduating valve to close the feed groove, resisted only by the normal friction of the piston and graduating valve, and then, after a further movement of the graduating valve by the triple valve piston, upon a predetermined reduction in brake pipe pressure, a local venting of fluid from the brake pipe is effected, without moving the main slide valve of the triple valve device, thereby causing similar quick serial service operation of all triple valve devices throughout the train, each in advance of the application of the brakes on that car.

As a result, a limited and sharp brake pipe reduction is rapidly transmitted throughout the train, which causes the triple valve piston to first positively close the feed groove, before any appreciable back flow from the auxiliary reservoir to the brake pipe can occur, and then the triple valve pistons move out to service application position, thus initiating an application of the brakes.

In the apparatus disclosed in Patent No. 2,034,287, means are provided for securing a quick service venting of fluid from the brake pipe when a further reduction in brake pipe pressure is made to effect a second application of the brakes. In the movement of the triple valve piston and graduating valve relative to the main valve from service lap position to uncover the usual service application port, communication is established for venting fluid from the brake pipe to cause a local quick service venting of fluid from the brake pipe. A spring carried by the triple valve piston stem tends to resist movement of the graduating valve and piston beyond this quick service position, but it has been found that in some cases, the graduating valve may be moved beyond the quick service position in spite of the tendency of the spring to prevent such overtravel, before the desired degree of local quick service venting of fluid from the brake pipe has been obtained. Consequently, when this occurs, no second quick service application is accomplished and the speed of brake application is that of the usual service application on all cars to the rear of that containing the overtraveled graduating valve.

It is an object of this invention to provide means, in a triple valve device of the above character, for ensuring the desired quick service venting of fluid from the brake pipe in the movement of the graduating valve from service lap to service application position when a further or reapplication of the brakes is effected. This object of the invention is accomplished by so arranging the usual spring stop which opposes movement of the triple valve piston, that the overtravel or movement of the graduating valve beyond the reapplication quick service venting position is opposed both by the spring stop and by the initial quick service spring carried by the piston stem.

Another object of the invention is to provide a triple valve device having the above noted characteristics, wherein no additional parts are required for accomplishing the desired improved operation of the triple valve device.

These and other objects that will be made apparent throughout the further description of the invention are attained in the fluid pressure brake equipment hereinafter described and illustrated in the accompanying drawings wherein:

Fig. 1 is a diagrammatic sectional view of a fluid pressure brake equipment embodying my invention and showing the triple valve device in release position;

Fig. 2 is a fragmentary sectional view of the triple valve device in preliminary quick service position;

Fig. 3 is a fragmentary sectional view of the triple valve device showing the parts in service application position;

Fig. 4 is a fragmentary sectional view of the triple valve device showing the parts in service lap position; and Fig. 5 is a fragmentary sectional view of the triple valve device showing the parts in reapplication or secondary service position.

As shown in Fig. 1 of the drawings, the fluid pressure brake equipment may comprise a triple valve device 1, a brake pipe 2, a brake cylinder 3, an auxiliary reservoir 4, and a volume reservoir or bulb 5.

The triple valve device 1 comprises a casing having a piston chamber 6, connected to the brake pipe 2, and containing a piston 7, and having a valve chamber 8, connected to the auxiliary reservoir 4 and containing a main slide valve 9, and a graduating slide valve 10, mounted on and having a movement relative to the main slide valve, said valves being operated by said piston through a piston stem 11.

Carried by said stem at its rear end is a movable member 12, subject to the pressure of a coil spring 13. A pin 14 is carried by the main valve 9 at its rear end and extends transversely through a notch 15 in the stem 11. The pin 14 is so positioned that upon forward movement of the stem 11, a projecting portion 16 of the member 12 engages the said pin. The usual stop member 17, subject to the pressure of a coil spring 18, is provided, adapted to yieldingly oppose the movement of the piston 7 to full service position and to initiate movement of the piston away from the service application position and out of engagement with the usual sealing gasket.

In the release position of the triple valve parts, as shown in Fig. 1, a feed passage 21, around the triple valve piston 7 permits the supply of fluid under pressure from the piston chamber 6 and the brake pipe 2 to the valve chamber 8 and the auxiliary reservoir 4, so that the auxiliary reservoir is charged with fluid under pressure in the usual manner, when the brake pipe is charged through the operation of the engineer's brake valve on the locomotive (not shown).

In release position, the passage 22, leading to the brake cylinder 3, through passage and pipe 23 is connected to an exhaust passage 24 through a cavity 25 in the main slide valve 9, so that the brake cylinder is open directly to the atmosphere.

Upon a reduction in brake pipe pressure to effect an application of the brakes, the piston 7 moves at a slight differential in pressure between the auxiliary reservoir and the brake pipe, (usually less than 1 lb.), so as to close the feed passage 21 and prevent back flow from the auxiliary reservoir to the brake pipe.

The piston 7 moves the graduating valve 10 relative to the main valve 9 until the projection 16 engages the pin 14. Further movement of the piston is then opposed by the pressure of the spring 13, the tension of which is such as to prevent slight fluctuations in brake pipe pressure from unintentionally effecting movement of the graduating valve to preliminary quick service position. When the brake pipe pressure is further reduced a predetermined but slight amount, for example, a reduction of 1 lb., the tension of spring 13 is such that its resistance is overcome, permitting the piston to move the graduating valve 10 to the initial or preliminary quick service position, as shown in Fig. 2, without moving the main slide valve 9.

In this position of the graduating valve, cavity 26 and associated passage 27 in the graduating valve, connect passages 28 and 29 in the main slide valve and the port 28 registers, in the release position of the main valve 9, as shown in Figs. 1 and 2, with a passage 31 which connects with the brake pipe, through the check valve chamber 32 having a ball check valve 33 therein and passage 34 and passage and pipe 35. Fluid under pressure is then vented from the brake pipe to the bulb or volume reservoir 5 through pipe and passage 35, passage 34, past the ball check valve 33, into chamber 32, passage 31, port 28 in the main slide valve, cavity 26 and passage 27 in the graduating valve, port 29 in the main valve, passage and pipe 36, so as to produce a sharp and definite local reduction in brake pipe pressure, before the triple valve parts move to service application position as shown in Fig. 3. This local reduction is rapidly transmitted to the next car of the train, causing the triple valve on said next car to act in a similar manner, and so on throughout the length of the train. As a consequence, the quick serial service action takes place on each car in advance of the application of the brakes on that car.

Following the above described quick service venting of fluid from the brake pipe, the triple valve piston and main slide valves on each car are positively moved to service application position, in which position, as shown in Fig. 3, port 37 in the main valve 9 is uncovered and registers with the passage 22. Fluid under pressure may then flow from the auxiliary reservoir 4 to the brake cylinder 3 through pipe and passage 38, valve chamber 8, port 37 in the main valve, passage 22, and passage and pipe 23. A service application of the brakes is therefore effected in the usual manner.

The movement of the main valve 9 toward service application position operates to cut off the free passage of fluid from the brake pipe to the bulb or volume reservoir 5 through the port 28 in the main valve and the cavity 26 and passage 27 in the graduating valve, and establishes communication between the brake pipe and the bulb or volume reservoir 5 through passage 39 and restricted passage 41 in the main valve which connects passages 31 and 36. When the main valve and graduating valve are in the application service position, fluid under pressure flows from the brake pipe to the bulb or volume reservoir at a restricted rate until the pressure within the volume reservoir is equalized with that in the brake pipe. Restriction of the flow of fluid from the brake pipe to the volume reservoir prevents undesirable surges of the fluid within the brake pipe and insures the desired reduction in brake pipe pressure.

The total reduction in brake pipe pressure resulting from the above described quick service action is sufficient to produce a desired and effective brake cylinder pressure, such as, for example, a brake cylinder pressure of 7 to 8 lbs.

When the auxiliary reservoir pressure has been reduced by flow to the brake cylinder to a pressure slightly less than the reduced brake pipe pressure, the piston 7 moves the graduating valve 10 back to service lap position as shown in Fig. 4, in which the supply of fluid to the brake cylinder is cut off and in which communication from the brake pipe to the volume reservoir is still maintained, through the passage 39 and restricted passage 41 in the main valve. It will be noted that the movement of the graduating valve toward the right is arrested in the service lap position by engagement of the flange 42 of the stem 11 with the left end of the main valve and that the left end of the stem 11 is spaced from the stop 17 a distance equal to the distance between the pin 14 on the main valve and the projection 16 of a movable member 12 carried by the stem. It will be apparent, therefore, that when the piston 7 is moved to the left toward the service application position in response to a subsequent reduction in brake pipe pressure, that the movement of the piston and stem will be yieldingly opposed simultaneously by the stop member 17 supported by the casing 18 of the triple valve device and by the pin 14 that is carried by the main valve 9. The purpose of this arrangement of the spring stop members will be hereinafter made apparent.

After an initial service application of the brakes has been effected, a subsequent or further application may be effected by a further venting of fluid from the brake pipe by operation of the engineer's brake valve and thereby causing movement of the triple valve piston to the reapplication position as shown in Fig. 5, wherein the left end of the piston stem 11 is in engagement with the spring stop member 17 and the projection 16 is in engagement with the pin 14 on the main valve, so that movement of the graduating valve and piston beyond the reapplication position shown is opposed by the resistance of the springs 13 and 18, and the graduating valve will be held in this position until the reduction in brake pipe pressure occasioned by the second quick service activity of the valve causes further movement of the piston and the main valve to the service application position shown in Fig. 3.

When the graduating valve is in the reapplication position shown in Fig. 5, fluid under pressure flows from the brake pipe to the brake cylinder at a restricted rate through the passage 35, passage 34, past the check valve 33, check valve chamber 32, passage 31, passage 39, restricted passage 43 and port 44 in the main valve, passage 27 and cavity 26 in the graduating valve, port 28 in the main valve, and passage and pipe 23.

It has been found that when the graduating valve is in service lap position and the brake pipe pressure is reduced to effect the second application of the brakes, there is a tendency for the graduating valve to overtravel because the tension of the spring 13 is insufficient to prevent it from doing so. If the tension of the spring 13 should be made sufficient to prevent overtravel of the piston and graduating valve when moving from service lap to service application position, then too much resistance would be offered to the movement of the graduating valve to preliminary quick service position as shown in Fig. 2, from the release position shown in Fig. 1.

The pin 14 on the main valve is so positioned with respect to the main valve and the projection 16 of the movable member 12 that the projection 16 engages the pin 14 when the graduating valve has just moved into reapplication quick service position. According to my invention, the stop 17 is adapted to engage the piston stem at the same time that the projection 16 engages the pin 14.

Further movement, or overtravel of the graduating valve past reapplication position is, therefore, yieldingly and simultaneously opposed by the combined resistance of the springs 18 and 13 and movement of the graduating valve into service application position is delayed sufficiently to insure a local quick service reduction in brake pipe pressure, effected by the establishing of communication between the brake pipe and the brake cylinder through the passages above described.

It is apparent from the foregoing that the graduating valve is yieldingly arrested in reapplication quick service position by the combined restraining action of the springs 18 and 13 for sufficient time to initiate a second local reduction in brake pipe pressure, and that this reduction will cause the movement of the triple valve device on the succeeding car to reapplication service position and so on, serially throughout the remaining cars of the train. By simply rearranging the parts of the standard quick service triple valve structure, the overtravel of the graduating valve past reapplication quick service position is prevented, without the addition of parts or increase in cost of production.

When the graduating valve 10 has moved to service application position from the reapplication quick service position, fluid under pressure is again supplied to the brake cylinder from the auxiliary reservoir in the manner above described and when the pressure in the valve chamber 8 falls slightly below the brake pipe pressure, the piston 7 is moved to the service lap position shown in Fig. 4.

Quick service applications of the brakes may, therefore, be repeated to gradually increase the brake cylinder pressure as desired.

Summarizing, a triple valve device is provided which may be used in conjunction with a volume reservoir and a brake cylinder for effecting repeated quick service applications of the brakes, first, by venting fluid from the brake pipe to the volume reservoir for the first quick service action of the triple valve device and for obtaining a first quick service application of the brakes, and second, by venting fluid under pressure from the brake pipe into the brake cylinders to obtain a second quick service application of the brakes or subsequent quick service application of the brakes if desired.

Spring stop means are provided for controlling the operation of the main valve and the graduating valve and these stop devices are so positioned with respect to the piston, main valve, graduating valve and the piston stem that they operate concurrently to prevent overtravel of the graduating valve from the service lap position to the reapplication position wherein fluid is vented from the brake pipe into the brake cylinder to effect a second or subsequent quick service application of the brakes.

It should be understood that the feature of stabilizing the brake controlling valve device in its movement to the initial quick service position is broadly covered in the above-mentioned patents of Clyde C. Farmer, No. 2,032,169 and No. 2,031,213, and that the subject matter of the present invention is limited to specific features not disclosed in these two patents.

While but one embodiment of the invention is disclosed it is obvious that changes may be made in the construction without departing from the spirit of the invention.

Having now described my invention, what I claim as new and desire to secure by Letters Patent, is:

1. In a fluid pressure brake, the combination with a brake pipe, of a triple valve device comprising a main valve, a graduating valve, and a piston operated upon a reduction in brake pipe pressure for moving said graduating valve with respect to said main valve to a position for locally venting fluid from the brake pipe, yielding means for opposing further movement of said graduating valve with respect to the main valve, and an additional yielding means for also opposing said further movement of the graduating valve.

2. In a fluid pressure brake, the combination with a brake pipe, of a triple valve device comprising a main valve, a graduating valve, and a piston operated upon a reduction in brake pipe pressure for moving said graduating valve to a position for locally venting fluid from the brake pipe, yielding means moved by said piston for opposing further movement of said graduating valve from said venting position, and additional yielding means for also opposing such further movement.

3. In a fluid pressure brake, the combination with a brake pipe and a triple valve device comprising a casing, a main valve therein, a graduating valve having a movement relative to the main valve, and a piston operated upon a reduction in brake pipe pressure for operating said valves, of means operative upon movement of said graduating valve relative to the main valve to a predetermined position for venting fluid under pressure from the brake pipe for effecting a reduction in brake pipe pressure, and a pair of separate yielding stop means, one of which is movable with the piston and engages the main valve, for concurrently and yieldingly opposing movement of the graduating valve from that position.

4. In a fluid pressure brake, the combination with a brake pipe and a triple valve device comprising a casing, a main valve therein, a graduating valve having a movement relative to the main valve, and a piston device operated upon a reduction in brake pipe pressure for operating said valves, of means operative upon movement of said graduating valve relative to the main valve to a predetermined position for venting fluid under pressure from the brake pipe for effecting a reduction in brake pipe pressure, and a pair of separate yielding stop means, one of which is carried by the piston device and engages the main valve, and the other of which is carried by the casing and engages the piston device for concurrently and yieldingly opposing movement of the graduating valve from that position.

5. In a fluid pressure brake, the combination with a brake pipe and a triple valve device comprising a casing, a main valve therein, a graduating valve having a movement relative to the main valve, and a piston device operated upon a reduction in brake pipe pressure for operating said valves, of means operative upon movement of said graduating valve relative to the main valve to a predetermined position for venting fluid under pressure from the brake pipe, a stop member carried by the piston device engaging the main valve and a stop member on the casing and engaging the piston device for simultaneously and yieldingly opposing movement of the graduating valve from the said position.

6. In a fluid pressure brake, the combination with a brake pipe and a triple valve device comprising a casing, a main valve therein, a graduating valve having a movement relative to the main valve, and a piston device operated upon a reduction in brake pipe pressure for operating said valves, of means operative upon movement of said graduating valve relative to the main valve to a predetermined position when the main valve is in one operative position for venting fluid under pressure from the brake pipe, a stop member on the casing and engaging the piston device for opposing movement of the graduating valve from the said position, and a stop member carried by the piston device for engaging the main valve when the said valve is in the said operative position for augmenting the first stop member in opposing the movement of the graduating valve from the said position.

7. In a fluid pressure brake, the combination with a brake pipe and a triple valve device comprising a casing, a main valve therein, a graduating valve having a movement relative to the main valve and a piston device operated upon a reduction in brake pipe pressure for operating said valves, of means operative upon movement of said graduating valve relative to the main valve to a predetermined position for venting fluid under pressure from the brake pipe, yielding means cooperating with the main valve, and yielding means independent of the main valve for substantially simultaneously yieldingly opposing further movement of the graduating valve from that position.

8. In a fluid pressure brake, the combination with a brake pipe and a triple valve device comprising a casing, a main valve therein, a graduating valve having a movement relative to the main valve, and a piston operated upon a reduction in brake pipe pressure for operating said valves, of means operative upon movement of said graduating valve in one direction with respect to the main valve and to a predetermined position, for venting fluid under pressure from the brake pipe, and at least two separate yielding means for yieldingly and concurrently opposing further movement of the graduating valve in the said direction.

9. In a fluid pressure brake, the combination with a brake pipe and a triple valve device comprising a casing, a main valve, a graduating valve and a piston device operated upon a reduction in brake pipe pressure for operating said valves, of means operative upon movement of said graduating valve to a predetermined position for venting fluid under pressure from the brake pipe, and a pair of separate yielding stop means, one of which is carried by the piston device and engages the main valve for concurrently and yieldingly opposing movement of the graduating valve from that position.

10. In a fluid pressure brake, the combination with a brake pipe and a triple valve device comprising a main valve, a graduating valve having a movement relative to the main valve, and a piston device operated upon a reduction in brake pipe pressure for operating said valves, of means operative upon movement of said graduating valve relative to the main valve to a predetermined position when the main valve is in one position for venting fluid under pressure from the brake pipe, stop means for yieldingly opposing the said movement of the graduating valve to the said position, a second means operative upon movement of the said graduating valve relative to the main valve to a second predetermined position when the main valve is in another position for venting fluid under pressure from the brake pipe, and a second stop means for yieldingly opposing movement of the main valve to the said other position, the said two stop means being adapted to concurrently, yieldingly oppose movement of the graduating valve from the second predetermined position.

11. In a fluid pressure brake, the combination with a brake pipe, a brake cylinder, a volume reservoir and a triple valve device comprising a main valve, a graduating valve having a movement relative to the main valve, and a piston device operated upon a reduction in brake pipe pressure for operating said valves, of means operative upon movement of said graduating valve relative to the main valve to a predetermined position when the main valve is in one position for venting fluid under pressure from the brake pipe to the said volume reservoir for effecting a reduction in brake pipe pressure, stop means for yieldingly opposing the movement of the graduating valve to the said position, a second means operative upon movement of the said graduating valve relative to the main valve to a second predetermined position when the main valve is in another position for venting fluid under pressure from the brake pipe to the brake cylinder for effecting a second reduction in brake pipe pressure, and a second stop means for yieldingly opposing movement of the main valve to the said other position, the said two stop means being adapted to concurrently, yieldingly oppose movement of the graduating valve from the second predetermined position.

12. In a fluid pressure brake, the combination with a brake pipe and a triple valve device comprising a main valve movable to two operative positions, a graduating valve movable to two operative positions with respect to the main valve for venting fluid under pressure from the brake pipe to effect separate reductions in brake pipe pressure, of a stop means for yieldingly opposing movement of the main valve from one operative position to the other, and a stop means for yieldingly opposing movement of the graduating valve to one of its operative positions, the said two stop means being adapted to concurrently, yieldingly oppose the movement of the graduating valve from its other operative position.

13. In a fluid pressure brake, the combination with a brake pipe and a triple valve device comprising a main valve movable to two operative positions, a graduating valve movable to two operative positions with respect to the main valve for venting fluid under pressure from the brake pipe to effect separate reductions in brake pipe pressure, of a stop means for yieldingly opposing movement of the main valve from one operative position to the other, and a stop means cooperating with the main valve for yieldingly opposing movement of the graduating valve to one of its operative positions, the said two stop means being adapted to concurrently, yieldingly oppose the movement of the graduating valve from its other operative position.

14. In a fluid pressure brake, the combination with a brake pipe, of a triple valve device comprising a main valve, a graduating valve, and a piston operated upon a reduction in brake pipe pressure and having a stem for moving said graduating valve with respect to the main valve to a position for locally venting fluid from the brake pipe, a yielding means carried by said piston stem for opposing further movement of said graduating valve with respect to the main valve and from said venting position, and additional yielding means for also opposing such further movement.

15. In a fluid pressure brake, the combination with a brake pipe and a triple valve device comprising a casing, a main valve therein, a graduating valve having a movement relative to the main valve, and a piston operated upon a reduction in brake pipe pressure and having a stem for operating said vlaves, of means operative upon movement of said graduating valve relative to the main valve to a predetermined position for venting fluid under pressure from the brake pipe for effecting a reduction in brake pipe pressure, and a pair of separate yielding stop means, one of which is carried by the said stem of the piston and engages the main valve for concurrently and yieldingly opposing movement of the graduating valve from that position.

16. In a fluid pressure brake, the combination with a brake pipe, of a brake controlling valve device comprising a graduating valve adapted to be moved into two different positions for effecting local venting of the brake pipe, and a pair of yielding stop means, one of which is effective alone to resist movement of the graduating valve into one of said positions, and both of which are effective concurrently to resist movement of said graduating valve from the other of said positions.

17. In a fluid pressure brake, the combination with a brake pipe, and a brake cylinder, of a brake controlling valve device comprising a main valve, an auxiliary valve, said auxiliary valve being movable to a position to establish a communication through which fluid under pressure is locally vented from the brake pipe when said main valve is in one position, and movable into another position to establish another communication through which fluid under pressure is locally vented from the brake pipe when said main valve is in another position, and a pair of yielding stop means, one of which is effective alone to resist movement of the auxiliary valve to said first position and both of which are simultaneously effective to resist movement of said auxiliary valve from said other position.

18. In a fluid pressure brake, the combination with a brake pipe, of a brake controlling valve device comprising fluid pressure responsive means operatively responsive to variations in brake pipe pressure, a main valve shiftable by the fluid pressure responsive means from release position to application position, an auxiliary valve shiftable by the fluid pressure responsive means to a certain position relative to the main valve for establishing a communication through which fluid under pressure is vented from the brake pipe while the main valve is in release position, and shiftable to a second position relative to the main valve for establishing a communication through which fluid under pressure is vented from the brake pipe while the main valve is in application position, resilient means yieldingly opposing movement of the auxiliary valve relative to the main valve into the said certain position when the main valve is in release position, and a second resilient means effective to oppose movement of said fluid pressure responsive means, said two resilient means being simultaneously effective to yieldingly oppose further movement of said auxiliary valve in the same direction relative to said main valve following the shifting of the auxiliary valve into the second position thereof relative to the main valve when the main valve is in application position.

ELLIS E. HEWITT.